(12) United States Patent
Kim

(10) Patent No.: US 9,014,919 B2
(45) Date of Patent: Apr. 21, 2015

(54) METHOD AND SYSTEM FOR CONTROLLING CHANGE OF LANE

(71) Applicant: Hyundai Motor Company, Seoul (KR)

(72) Inventor: Hoi Won Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/967,684

(22) Filed: Aug. 15, 2013

(65) Prior Publication Data

US 2014/0309889 A1    Oct. 16, 2014

(30) Foreign Application Priority Data

Apr. 11, 2013    (KR) .................. 10-2013-0039914

(51) Int. Cl.
*B62D 6/00* (2006.01)
*B60K 31/00* (2006.01)
*B62D 15/02* (2006.01)

(52) U.S. Cl.
CPC .................. *B62D 15/0255* (2013.01)

(58) Field of Classification Search
USPC ...................... 701/41, 42; 180/170
See application file for complete search history.

(56) References Cited

U.S. PATENT DOCUMENTS

| | | | |
|---|---|---|---|
| 6,311,119 B2* | 10/2001 | Sawamoto et al. ............ 701/96 |
| 8,112,225 B2* | 2/2012 | Eidehall et al. ............... 701/301 |
| 8,428,843 B2* | 4/2013 | Lee et al. ......................... 701/93 |
| 8,670,903 B2* | 3/2014 | Lee et al. ......................... 701/41 |
| 2003/0234127 A1* | 12/2003 | Sudou et al. ................... 180/170 |
| 2005/0015203 A1 | 1/2005 | Nishira |
| 2005/0187670 A1* | 8/2005 | Katayama et al. ................ 701/1 |
| 2010/0082195 A1* | 4/2010 | Lee et al. ........................ 701/25 |
| 2010/0228420 A1* | 9/2010 | Lee .................................. 701/26 |
| 2012/0109410 A1* | 5/2012 | Hanzawa et al. ................. 701/1 |

FOREIGN PATENT DOCUMENTS

| | | | |
|---|---|---|---|
| JP | 2002144912 A | 5/2002 |
| JP | 2005038325 A | 2/2005 |
| JP | 2008-044561 A | 2/2008 |
| JP | 2009-040267 A | 2/2009 |
| KR | 10-2005-0111019 | 11/2005 |
| KR | 1020080084452 | 9/2008 |

* cited by examiner

*Primary Examiner* — Thomas G Black
*Assistant Examiner* — Tyler Paige
(74) *Attorney, Agent, or Firm* — Mintz Levin Cohn Ferris Glovsky and Popeo, P.C.; Peter F. Corless

(57) ABSTRACT

A lane change control method and system that include a driver mode setting unit that sets a driver's lane change mode based on a lane change mode input from a plurality of lane change modes and a lane change path generation unit that generates a lane change path based on the lane change mode set by the driver mode setting unit, a transverse acceleration of vehicle, a target path angle and a target transverse distance path. In addition, a path follow up controller executes a lane change based on the lane change path by calculating steering angle information that corresponds to the lane change path.

14 Claims, 3 Drawing Sheets

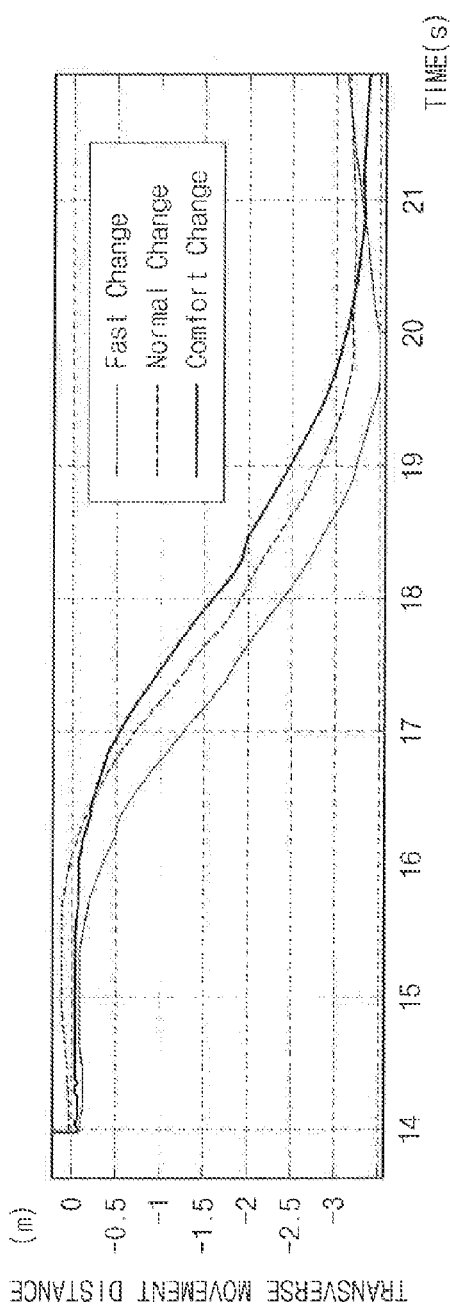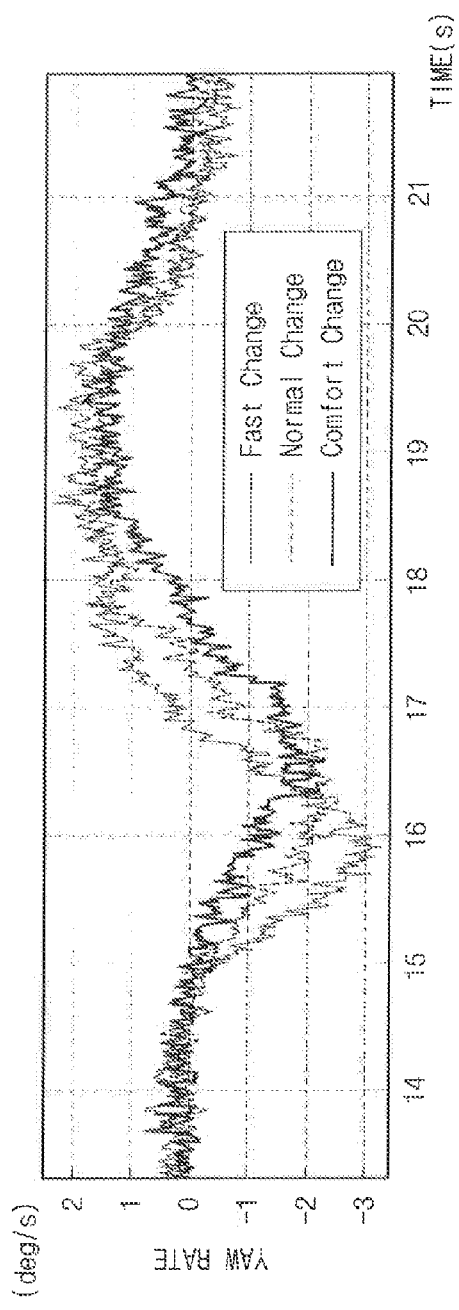
Fig. 3A
Fig. 3B

METHOD AND SYSTEM FOR CONTROLLING CHANGE OF LANE

CROSS-REFERENCE TO RELATED APPLICATION

This application is based on and claims priority from Korean Patent Application No. 10-2013-0039914, filed on Apr. 11, 2013 in the Korean Intellectual Property Office, the disclosure of which is incorporated herein in its entirety by reference.

BACKGROUND

1. Field of the Invention

The present invention relates to a method and system that controls a lane change while driving a vehicle.

2. Description of the Related Art

A recently developed technology controls a lane change and ensures a safe lane change while driving by increasing an actuating force of a steering wheel when the lane change is not safe based on a distance from a following vehicle and a relative velocity.

On the other hand, a driving style of a vehicle appears differently depending on a driver's propensity, and a currently proposed lane change control of the vehicle is focused on safety such as the distance from the following vehicle rather than the driver's propensity.

SUMMARY

The present invention provides a lane change control method and system that changes the lane of the vehicle while reflecting the driver's propensity.

In accordance with an aspect of the present invention, a lane change control system may include: a driver mode setting unit that sets a driver's lane change mode based on a lane change mode input from a plurality of lane change modes; a lane change path generation unit that generates a lane change path based on the lane change mode set by the driver mode setting unit, a transverse acceleration of vehicle, a target path angle and a target transverse distance path; and a path follow up controller that executes a lane change based on the lane change path by calculating steering angle information that corresponds to the lane change path.

The plurality of the lane change modes have a different lane change time respectively, and the lane change path generation unit generates the lane change path for each lane change mode by applying the lane change time that corresponds to each of the plurality of the lane change modes when calculating the vehicle transverse acceleration, the target path angle, and the target transverse distance path.

The path follow up controller may include: a path error feedback controller that determines a difference between the lane change path and a current transverse position of the vehicle based on target transverse distance path information which is generated by the transverse position of the vehicle and the lane change path generation unit and measuring information of the vehicle, and calculates a first target front wheel angle, and outputs a path error control signal that corresponds to the first target front wheel angle; a disturbance feed forward controller that calculates a second front wheel angle based on a road curvature of the vehicle, road inclination angle information of the vehicle and the measuring information of the vehicle, and generates and outputs disturbance control signal that corresponds to the second target front wheel angle; a state feedback controller that calculates a third target front wheel angle based on vehicle state information and the measuring information of the vehicle, and generates and outputs a vehicle state control signal that corresponds to the third target front wheel angle; an integrated observer that transmits the measuring information of the vehicle transmitted by a sensor to the path error feedback controller, the disturbance feed forward controller, and the state feedback controller; and a steering controller that calculates a final target front wheel angle for the lane change based on the path error control signal, the disturbance control signal and the vehicle state control signal to determine the steering angle information.

The steering angle controller may calculate the final target front wheel angle by adding the first target front wheel angle, the second front wheel angle, and the third front wheel angle. The vehicle state information may include a vehicle transverse position, a heading angle between a vehicle and a lane, and a vehicle yaw rate. The measuring information of the vehicle may include a vehicle slip angle and a vehicle road inclination angle.

The lane change path generation unit may generate a transverse acceleration profile as a Sin (sinusoid) Wave to cause the transverse acceleration to start from 0 during the start of the lane change and end at 0 at the time of finishing the lane change when calculating the transverse acceleration of the vehicle. The lane change path generation unit may generate a target path angle by integrating the transverse acceleration when calculating the target path angle. In addition, the lane change path generation unit may generate a transverse distance path by integrating the target path angle when calculating the target transverse distance path.

BRIEF DESCRIPTION OF THE DRAWINGS

The objects, features and advantages of the present invention will be more apparent from the following detailed description in conjunction with the accompanying drawings, in which:

FIGS. 3A-3B is an exemplary diagram showing a lane change test result according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
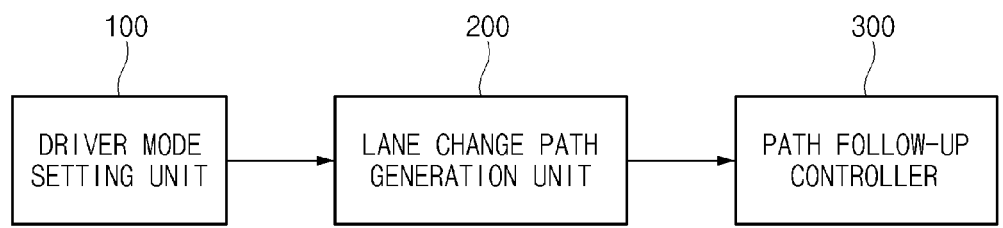
FIG. 1 is an exemplary diagram showing a configuration of a lane change control system according to an exemplary embodiment of the present invention.

FIG. 1 is an exemplary diagram showing a configuration of a lane change control system according to an exemplary embodiment of the present invention. As illustrated in FIG. 1, the lane change control system may include a driver mode setting unit 100 executed by a controller, a lane change path generation unit 200 executed by the controller, and a path follow-up controller 300.

Specifically, the lane change path generation unit 200 may be configured to generate a transverse position for the lane change, and the pathway follow-up controller 300 may be configured to calculate a steering angle to follow the generated transverse path. In addition, the driver mode setting unit 100 may be configured to set the lane change mode of the driver based on the lane change mode input from a plurality of lane change modes.

Although not shown, the driver mode setting unit 100 may be implemented to set the lane change mode with a selection switch type like an ON/OFF switch within the vehicle, or may be implemented to set the lane change mode via the setting of a vehicle monitor, but is not limited to thereof, and may be implemented in different types depending on the needs of the operator.

In addition, the lane change path generation unit 200 may be configured to generate the lane change path based on the lane change mode set by the driver mode setting unit 100, the transverse acceleration of the vehicle, the target path angle, and the target transverse distance path. A plurality of lane change modes may respectively have a different lane change time. For example, as illustrated in equation 1, the lane change time may be divided into a Fast, a Normal, and a Comfort category to reflect the selection of the mode in which the lane change used time ($T_{LC}$) from the beginning of lane change until the end of the lane change according to the driver's driving propensity.

Here, as the lane change used time, respectively, TLC_Normal is greater than TLC_Fast, and TCL_Comfort is greater than TLC_Normal as illustrated in Equation 1.

$$T_{LC\_Fast} < T_{LC\_Normal} < T_{LC\_Comfort} \quad \text{[Equation 1]}$$

1) Normal Mode: $T_{LC} = T_{LC\_Normal}$

2) Fast Mode: $T_{LC} = T_{LC\_Fast}$

3) Comfort Mode: $T_{LC} = T_{LC\_Comfort}$

In addition, the lane change path generation unit 200 may be configured to generate the lane change path for each lane change mode by applying the lane change time that corresponds to each of the lane change modes when calculating the transverse acceleration of the vehicle, the target path angle, and the target transverse distance path. Additionally, when calculating the transverse acceleration of the vehicle, the lane change path generation unit 200 may be configured to generate a transverse acceleration profile as a Sin Wave to allow the transverse acceleration to start from 0 at the time of starting the lane change and end at 0 when finishing the lane change.

Here, the lane change path generation unit 200 may be configured to calculate the transverse acceleration of the vehicle using Equation 2.

$$a_{lat}(t) = a_{amp} \sin\left(\frac{2\pi}{T_{LC}} t + \phi\right) + a_{offs} \quad \text{[Equation 2]}$$

wherein, $a_{lat}$ may refer to the transverse acceleration, $a_{amp}$ refers to a transverse acceleration amplitude, $T_{LC}$ refers to the lane change used time, $\phi$ refers to a transverse acceleration phase, and $a_{offs}$ refers to a transverse acceleration offset.

In addition, the lane change path generation unit 200 may be configured to generate the target path angle by integrating the transverse acceleration at the time of calculating the target path angle. For example, the lane change path generation unit 200 may be configured to generate the target path angle using Equation 3.

$$\begin{aligned}\theta_{ref}(t) &= \frac{v_{lat}(t)}{v_{long.init}} \quad \text{[Equation 3]}\\ &= \frac{1}{v_{long.init}} \int_0^t \left(a_{amp} \sin\left(\frac{2\pi}{T_{LC}}\tau + \phi\right) + a_{offs}\right) d\tau \\ &= \frac{1}{v_{long.init}} \left(\frac{a_{amp} T_{LC}}{2\pi}\left(\cos\phi - \cos\left(\frac{2\pi}{T_{LC}}t + \phi\right)\right) + a_{offs} t\right) + \\ &\quad \theta_{init}\end{aligned}$$

wherein, $\theta_{ref}$ may refer to the target path angle, $v_{lat}$ refers to a target transverse velocity, $v_{long.init}$ refers to a longitudinal velocity, $a_{amp}$ refers to the transverse acceleration amplitude, $a_{offs}$ refers to the transverse acceleration offset, and $\theta_{init}$ refers to an initial path angle.

Furthermore, the lane change path generation unit 200 may be configured to generate the transverse distance path by integrating the target path angle at the time of generating the target transverse distance path. For example, the lane change path generation unit 200 may be configured to generate the target transverse distance path using Equation 4.

$$y_{ref}(t) = \int_0^t v_{lat}(\tau)d\tau \quad \text{[Equation 4]}$$
$$= \int_0^t \left(\frac{a_{amp}T_{LC}}{2\pi}\left(\cos\phi - \cos\left(\frac{2\pi}{T_{LC}}t + \phi\right)\right) + a_{offs}t + v_{long.init}\theta_{init}\right)d\tau$$
$$= \frac{a_{amp}T_{LC}}{2\pi}\left(t\cos\phi + \frac{T_{LC}}{2\pi}\left(\sin\phi - \sin\left(\frac{2\pi}{T_{LC}}t + \phi\right)\right)\right) + \frac{a_{offs}}{2}t^2 + v_{long.init}\theta_{init}t + y_{init}$$

wherein, $y_{ref}$ may refer to the target transverse distance path, $v_{lat}$ refers to the target transverse velocity, $a_{amp}$ refers to the transverse acceleration amplitude, $T_{LC}$ refers to the lane change used time, $y_{init}$ refers to an initial transverse position, $a_{offs}$ refers to the transverse velocity offset, $v_{long.init}$ refers to the longitudinal velocity, and $\theta_{init}$ refers to the initial path angle.

In addition, the path follow-up controller 300 may be configured to execute the lane change based on the lane change path by calculating the steering angle that corresponds to the lane change path. A detailed description of this will be described later.

Figure 2:
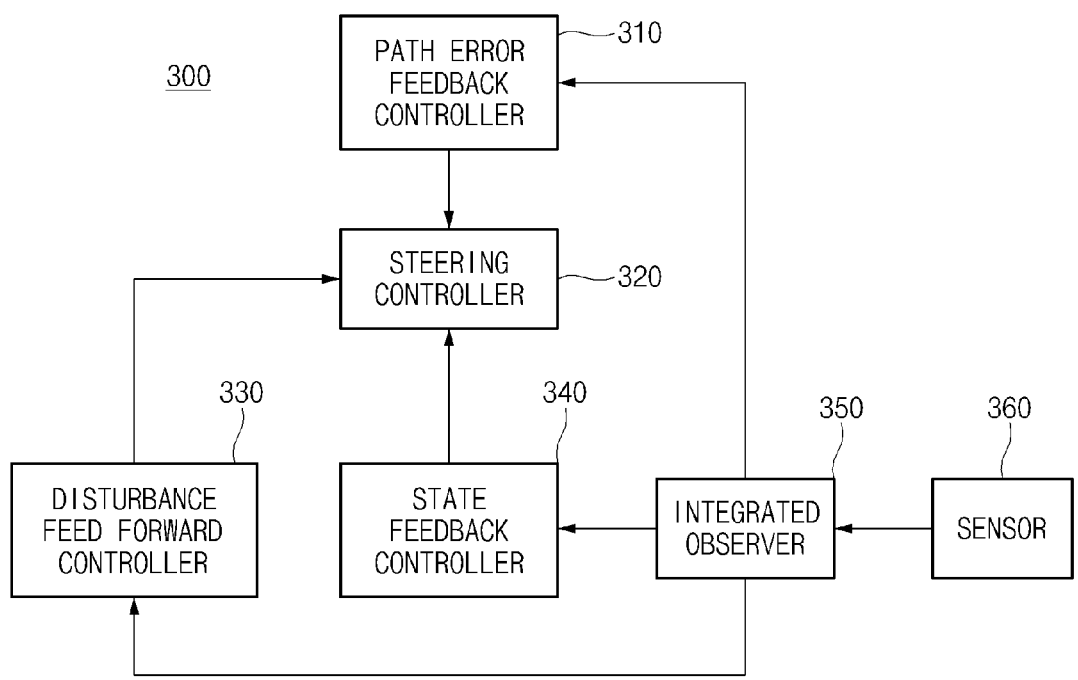
FIG. 2 is an exemplary diagram showing a configuration of a path follow-up controller according to an exemplary embodiment of the present invention in detail.

FIG. 2 is an exemplary diagram showing the configuration of the pathway follow-up controller according to an exemplary embodiment of the present invention in detail, and herein will explain more in detail of the pathway follow-up controller of FIG. 1.

The path follow-up controller 300 may include a path error feedback controller 310, a steering controller 320, a disturbance feed forward controller 330, a state feedback controller 340, an integration observer 350, and a sensor 360. In particular, the path follow-up controller 300 may include the path error feedback controller 310, the steering controller 320, the disturbance feed forward controller 330, the state feedback controller 340, the integration observer 350 and the sensor 360.

The path error feedback controller 310 may be configured to determine a difference, that is, the path error between the lane change path and a current transverse position of the vehicle based on target transverse distance path information generated by the transverse position of the vehicle and the lane change path generation unit 200, and measuring information of the vehicle transmitted from the integration observer 350, and may be configured to calculate a first target front wheel angle to compensate for the determined path error to output a path error control signal for the calculated first target front wheel angle.

The disturbance feed forward controller 330 may be configured to calculate a second target front wheel angle that corresponds to the disturbance based on information regarding a road curvature of the vehicle and a road inclination angle of the vehicle and the measuring information of the vehicle transmitted from the integration observer 350, and may be configured to output a disturbance control signal that corresponds to the calculated second target front wheel angle.

The state feedback controller 340 may be configured to calculate a third target front wheel angle that corresponds to a vehicle condition based on a state information of the vehicle and the measuring information of the vehicle transmitted from the integration observer 350, and may be configured to output a vehicle state control signal that corresponds to the calculated third target front wheel angle. In particular, the vehicle state information may include the transverse position of the vehicle, a heading angle between the vehicle and the lane, and a yaw rate of the vehicle. Additionally, the vehicle measuring information may include a slip angle of the vehicle and the road inclination angle of the vehicle.

The integration observer 350 may be configured to transmit the vehicle measuring information transmitted by the sensor 360 to the path error feedback controller 310, the disturbance feed forward controller 330, and the state feedback controller 340.

The steering controller 320 may be configured to determine steering angle information by calculating the target front wheel angle for lane change based on the path error control signal, the disturbance control signal, and the vehicle state control signal. In addition, the steering controller 320 may be configured to calculate a final target front wheel angle by combining the first target front wheel angle by the path error control signal, the second target front wheel angle by the disturbance control signal, and the third target front wheel angle by the vehicle state control signal.

Therefore, the steering controller 320 may be configured to calculate the steering torque or a current which are required by Electric Power Steering (EPS) to maintain the calculated final target front wheel angle. In other words, the lane change control system according to an exemplary embodiment of the present invention may be configured to execute the lane change based on the lane change path calculated via the lane change path generation unit 200, however, is able to move with the lane change path based on the steering angle information calculated via the steering controller 320 of the path follow up controller 300.

The load curvature of the vehicle, the transverse position of the vehicle, the heading angle between the vehicle and the lane, and the yaw rate of the vehicle described above are not shown herein, however, those are the information measured by the vehicle.

When the lane change is attempted using the lane change control system according to the present invention, the lane change test result, as illustrated in FIG. 3, may be shown in an exemplary graph of the result of a transverse movement distance (FIG. 3A) and the yaw rate (FIG. 3B). In addition, a control performance based on each lane change mode, as illustrated in table 1, indicates that the lane change time of Fast is 4.66, Normal is 5.50, and Comfort is 6.29, and the maximum yaw rate of Fast is 3.32, Normal is 2.64, Comfort is 2.31, and the lane change time is divided based on each lane change mode, thus, it may be possible to perform the lane change based on a propensity in drivers position.

TABLE 1

| | Control Performance | |
| --- | --- | --- |
| Division | Lane change time (s) | Maximum yaw rate (deg/s) |
| Fast | 4.66 | 3.32 |
| Normal | 5.50 | 2.64 |
| Comfort | 6.29 | 2.31 |

The lane change control method performing within the above-mentioned lane change control system may be recorded to a computer-readable recording medium by implementing as a program command type which may be performed via the various computer means. In particular, the computer-readable recording medium may include a program command, a data file, and a data structure etc. as in single or in combination. On the other hand, the program commands that record on the recording medium are specially designed and constructed for the present invention, and may be available by well known to those who are skilled in the computer software.

The computer-readable recording medium may include a magnetic such as a hard disk, a floppy disk, a magnetic tape, an optical media such as a CD-ROM and a DVD, a Magneto-Optical Media such as a Floptical Disk, and a specially configured hardware device which stores and performs the program commands such as a ROM, a RAM, and a flash memory. On the other hand, such recording medium may be a transmission media such as an optical, a metallic line, or a waveguide that includes a carrier wave which transmits a signal which assigns the program commands and a data structure.

In addition, the program command may include a machine language code such as made by a complier as well as a high-level language code which may be executed by the computer using an interpreter. The aforementioned hardware apparatus may be configured to operate as one or more software modules to carry out the operation of the present invention, and vice versa.

The lane change control system according to an exemplary embodiment of the present invention generates the lane change path by reflecting the lane change mode selection information of the driver, and a pathway follow-up control is performed according to the generated lane change path, which enables the lane change wherein the driver's propensity is reflected, and, accordingly, it may be possible to provide higher quality services to the driver.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. A lane change control system, comprising;
    a driver mode setting unit configured to set a driver's lane change mode based on a lane change mode input from a plurality of lane cange modes;
    a lane change path generation unit configured to generate a lane change path based on the lane change mode set by the driver mode setting unit, a transverse acceleration of vehicle, a target path angle and a target transverse distance path; and
    a path follow up controller configured to execute a lane change based on the lane change path by calculating steering angle information that corresponds to the lane change path,
    wherein the path follow up controller comprises:
        a path error feedback controller configured to;
        determine a difference between the lane change path and a current transverse position of the vehicle based on target transverse distance path information generated by the transverse position of the vehicle and the lane change path generation unit and measuring information of the vehicle;
        calculate a first target front wheel angle; and
        output a path error control signal that corresponds to the first target front wheel angle;
        a disturbance feed forward controller configured to;
        calculate a second front wheel angle based on a road curvature of the vehicle, a road inclination angle information of the vehicle and the measuring information of the vehicle; and
        generate and output a disturbance control signal that corresponds to the second target front wheel angle;
        a state feedback controller configured to;
        calculate a third target front wheel angle based on vehicle state information and the measuring information of the vehicle; and
        generate and output a vehicle state control signal that corresponds to the third target front wheel angle;
        an integrated observer configured to transmit the measuring information of the vehicle transmitted by a sensor to the path error feedback controller, the disturbance feed forward controller, and the state feedback controller; and
        a steering controller configured to calculate a final target front wheel angle for the lane change based on the path error control signal, the disturbance control signal and the vehicle state control signal to determine the steering angle information,
    wherein the steering angle controller is configured to calculate the final target front wheel angle by combining the first target front wheel angle, the second front wheel angle, and the third front wheel angle.

2. The lane change control system of claim 1, wherein the plurality of the lane change modes have a different lane change time respectively, and the lane change path generation unit is configured to generate the lane change path for each lane change mode by applying the lane change time that corresponds to each of the lane change modes when calculating the vehicle transverse acceleration, the target path angle, and the target transverse distance path.

3. The lane change control system of claim 1, wherein the vehicle state information includes a vehicle transverse position, a heading angle between a vehicle and a lane, and a vehicle yaw rate.

4. The lane change control system of claim 1, wherein the measuring information of the vehicle includes a vehicle slip angle and a vehicle road inclination angle.

5. The lane change control system of claim 1, wherein the lane change path generation unit is further configured to generate a transverse acceleration profile as a sinusoid wave to allow the transverse acceleration to start from 0 at the time of starting the lane change and end at 0 at the time of finishing the lane change when calculating the transverse acceleration of the vehicle.

6. The lane change control system of claim 1, wherein the lane change path generation unit is further configured to generate a target path angle by integrating the transverse acceleration when calculating the target path angle.

7. The lane change control system of claim 1, the lane change path generation unit is further configured to generate a transverse distance path by integrating the target path angle when calculating the target transverse distance path.

8. A lane change control method, comprising:
    setting, by a driver mode setting unit, a driver's lane change mode based on a lane change mode input from a plurality of lane change modes;
    generating, by a lane change path generation unit, a lane change path based on the lane change mode set by the driver mode setting unit, a transverse acceleration of vehicle, a target path angle and a target transverse distance path;
    executing, by a path follow up controller, a lane change based on the lane change path by calculating steering angle information that corresponds to the lane change path;
    determining, by the path follow up controller, a difference between the lane change path and a current transverse position of the vehicle based on target transverse distance path information generated by the transverse position of the vehicle and the lane change path generation unit and measuring information of the vehicle;

calculating, by the path follow up controller, a first target front wheel angle; and outputting, by the path follow up controller, a path error control signal that corresponds to the first target front wheel angle;

calculating, by the path follow up controller, a second front wheel angle based on a road curvature of the vehicle, a road inclination angle information of the vehicle and the measuring information of the vehicle;

generating and outputting, by the path follow up controller, a disturbance control signal that corresponds to the second target front wheel angle;

calculating, by the path follow up controller, a third target front wheel angle based on vehicle state information and the measuring information of the vehicle;

generating and outputting, by the path follow up controller, a vehicle state control signal that corresponds to the third target front wheel angle;

transmitting, by the path follow up controller, the measuring information of the vehicle transmitted by a sensor to the path error feedback controller, the disturbance feed forward controller, and the state feedback controller;

calculating, by the path follow up controller, a final target front wheel angle for the lane change based on the path error control signal, the disturbance control signal and the vehicle state control signal to determine the steering angle information; and calculating, by the path follow up controller, the final target front wheel angle by combining the first target front wheel angle, the second front wheel angle, and the third front wheel angle.

9. The lane change control method of claim 8, wherein the plurality of the lane change modes have a different lane change time respectively, and generating the lane change path further includes generating the lane change path for each lane change mode by applying the lane change time that corresponds to each of the lane change modes when calculating the vehicle transverse acceleration, the target path angle, and the target transverse distance path.

10. The lane change control method of claim 8, wherein the vehicle state information includes a vehicle transverse position, a heading angle between a vehicle and a lane, and a vehicle yaw rate.

11. The lane change control method of claim 8, wherein the measuring information of the vehicle includes a vehicle slip angle and a vehicle road inclination angle.

12. A non-transitory computer readable medium containing program instructions executed by a processor or controller, the computer readable medium comprising:

program instructions that control a driver mode setting unit to set a driver's lane change mode based on a lane change mode input from a plurality of lane change modes;

program instructions that control a lane change path generation unit to generate a lane change path based on the lane change mode set by the driver mode setting unit, a transverse acceleration of vehicle, a target path angle and a target transverse distance path;

program instructions that execute a lane change based on the lane change path by calculating steering angle information that corresponds to the lane change path;

program instructions that determine a difference between the lane change path and a current transverse position of the vehicle based on tar et transverse distance path information generated by the transverse position of the vehicle and the lane change path generation unit and measuring information of the vehicle;

program instructions that calculate a first target front wheel angle; and program instructions that output a path error control signal that corresponds to the first target front wheel angle;

program instructions that calculate a second front wheel angle based on a road curvature of the vehicle, a road inclination angle information of the vehicle and the measuring information of the vehicle; and program instructions that generate and output a disturbance control signal that corresponds to the second target front wheel angle;

program instructions that calculate a third target front wheel angle based on vehicle state information and the measuring information of the vehicle; and program instructions that generate and output a vehicle state control signal that corresponds to the third target front wheel angle;

program instructions that transmit the measuring information of the vehicle transmitted by a sensor to the path error feedback controller, the disturbance feed forward controller, and the state feedback controller;

program instructions that calculate a final target front wheel angle for the lane change based on the path error control signal, the disturbance control signal and the vehicle state control signal to determine the steering angle information; and program instructions that calculate the final target front wheel angle by combining the first target front wheel angle, the second front wheel angle, and the third front wheel angle.

13. The non-transitory computer readable medium of claim 12, further comprising:

program instructions that control the lane change path generation unit to generate the lane change path for each lane change mode by applying a lane change time that corresponds to each of the lane change modes when calculating the vehicle transverse acceleration, the target path angle, and the target transverse distance path.

14. The non-transitory computer readable medium of claim 12, wherein the vehicle state information includes a vehicle transverse position, a heading angle between a vehicle and a lane, and a vehicle yaw rate.

* * * * *